United States Patent
Fu et al.

(10) Patent No.: US 9,544,638 B2
(45) Date of Patent: Jan. 10, 2017

(54) METHOD FOR RECONSTRUCTING SYSTEM TIME CLOCK (STC) WITHOUT CARRYING PCR

(75) Inventors: Jiang Fu, San Diego, CA (US); Zhijie Yang, Beijing (CN); Brian A. Heng, Irvine, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 2216 days.

(21) Appl. No.: 11/529,607

(22) Filed: Sep. 29, 2006

(65) Prior Publication Data

US 2007/0242678 A1  Oct. 18, 2007

Related U.S. Application Data

(60) Provisional application No. 60/792,337, filed on Apr. 17, 2006.

(51) Int. Cl.
| | |
|---|---|
| H04N 21/434 | (2011.01) |
| H04L 25/49 | (2006.01) |
| H04L 7/033 | (2006.01) |
| H04N 21/2343 | (2011.01) |
| H04N 21/235 | (2011.01) |
| H04N 21/43 | (2011.01) |
| H04N 21/435 | (2011.01) |

(52) U.S. Cl.
CPC .......... *H04N 21/4348* (2013.01); *H04L 7/033* (2013.01); *H04L 25/49* (2013.01); *H04N 21/235* (2013.01); *H04N 21/234318* (2013.01); *H04N 21/4305* (2013.01); *H04N 21/435* (2013.01); *H04N 21/4307* (2013.01)

(58) Field of Classification Search
None
See application file for complete search history.

(56) References Cited

U.S. PATENT DOCUMENTS

| | | | | |
|---|---|---|---|---|
| 6,167,048 A | * | 12/2000 | Law et al. | 370/395.62 |
| 6,195,392 B1 | * | 2/2001 | O'Grady | 375/240.28 |

(Continued)

FOREIGN PATENT DOCUMENTS

| | | |
|---|---|---|
| CA | 2 184 517 A1 | 3/1998 |
| FI | EP 0981220 A2 * 2/2000 | .......... H04L 1/0002 |

(Continued)

OTHER PUBLICATIONS

"Information Technology—Generic Coding of Moving Pictures and Associated Audio Information: Systems," ISO/IEC 13818-1, 1540 Sun Nov. 13, 1994.

(Continued)

*Primary Examiner* — Mounir Moutaouakil
(74) *Attorney, Agent, or Firm* — Sterne, Kessler, Goldstein & Fox PLLC

(57) ABSTRACT

In conventional packet communications systems, such as MPEG-2, the data stream includes a program clock reference (PCR) so that the receiver decoder can lock on to the data stream. The invention eliminates the need to send the PCR by transferring a data transport rate explicitly in the header of the data packets so that the decoder can use the transport rate as a locking reference and adjust its phase lock loop. The transport rate is carried in the adaptation field as user private data.

20 Claims, 10 Drawing Sheets

(56) References Cited

U.S. PATENT DOCUMENTS

| | | | |
|---|---|---|---|
| 6,721,328 B1* | 4/2004 | Nichols et al. | 370/395.62 |
| 6,744,782 B1* | 6/2004 | Itakura et al. | 370/466 |
| 6,876,674 B1* | 4/2005 | Ruutu et al. | 370/503 |
| 7,103,072 B1* | 9/2006 | Sloan et al. | 370/503 |
| 7,106,758 B2* | 9/2006 | Belk et al. | 370/503 |
| 7,176,928 B1* | 2/2007 | Sendrovitz | 345/534 |
| 7,539,209 B2* | 5/2009 | Pelley | 370/468 |
| 7,693,244 B2* | 4/2010 | Gupta et al. | 375/355 |
| 7,693,398 B2* | 4/2010 | Kanemaru et al. | 386/239 |
| 7,924,885 B2* | 4/2011 | De-Leon et al. | 370/503 |
| 7,949,066 B2* | 5/2011 | Zehavi | H04L 1/0003 375/295 |
| 2005/0201399 A1 | 9/2005 | Woodward, Jr. et al. | |
| 2005/0265159 A1* | 12/2005 | Kanemaru et al. | 369/47.1 |
| 2006/0078300 A1* | 4/2006 | Salomons et al. | 386/85 |

FOREIGN PATENT DOCUMENTS

| | | |
|---|---|---|
| WO | WO 95/22855 | 8/1995 |
| WO | WO 97/34386 | 9/1997 |

OTHER PUBLICATIONS

European Search Report, Mar. 19, 2008.
Anderson et al., "Design of an MPEG-2 Transport Demultiplexor Core," IBM J. Res. Develop., vol. 43, No. 4, Jul. 1999, pp. 521-532.

\* cited by examiner though such a time stamp is known as a Program Clock Reference (PCR). The decoder uses these time stamps to ensure that the decoder time clock is synchronized to the encoder time clock and that the resulting transmission of audio, video and data is properly received and decoded.

METHOD FOR RECONSTRUCTING SYSTEM TIME CLOCK (STC) WITHOUT CARRYING PCR

CROSS REFERENCE TO RELATED APPLICATIONS

The present application claims the benefit of U.S. Provisional Patent Application No. 60/792,337, filed on Apr. 17, 2006, which is expressly incorporated by reference herein in its entirety.

BACKGROUND OF THE INVENTION

Field of the Invention

The present invention relates to a clock recovery system, and more specifically to a clock recovery system for receiving MPEG-2 signals.

Related Art

The ISO Moving Picture Experts Group (MPEG) established a standard by which digital bit representations of audio, video and data sources can be encoded, transmitted, received, and reliably decoded. This standard has been published as document ITU-T H.222.0, entitled "Information Technology—Generic Coding of Moving Pictures and Associated Audio Information: Systems". The MPEG-2 standard enables the transmission of digitized audio and video data in packetized form for insertion into a transport stream. Multiple sources of data may be multiplexed so that many users may share the same communications path.

In order to ensure reliable delivery of the audio, video and data to the end-user, the decoder clock must be synchronized with the encoder clock. Absence of synchronization will result in frame skips or frame holds in the case of video information, or its equivalent in the case of audio information. In order to achieve synchronization between the encoding clock and the decoding clock, the encoder inserts a time stamp into the transport stream, such a time stamp is known as a Program Clock Reference (PCR). The decoder uses these time stamps to ensure that the decoder time clock is synchronized to the encoder time clock and that the resulting transmission of audio, video and data is properly received and decoded.

In the traditional system infrastructure, if there are no PCR values carried within the stream, the decoder cannot evaluate the transport rate, it cannot lock on to the information stream, and the decoder clock will not be synchronized with the encoder clock.

What is needed is a more flexible approach to ensure the reliable decoding of single and multiplexed audio, video and data streams without the need to use PCR values. Further, it is desirable that the new approach require changes to firmware only and thereby be able to use existing PCR-based hardware.

SUMMARY OF THE INVENTION

The present invention is directed to a clock recovery system without the need to embed PCR values into the information byte-stream. Instead, by occasionally transferring the transport rate and the packet count, synchronization of the decoder clock to the encoder clock can be achieved. This new approach requires changes to firmware only and therefore existing PCR-based hardware can be used.

In an embodiment of this invention involving re-multiplexing, the values of the incoming transport rate and packet count are re-evaluated and updated for insertion into the output stream.

Further embodiments, features, and advantages of the present invention, as well as the structure and operation of the various embodiments of the present invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1A:
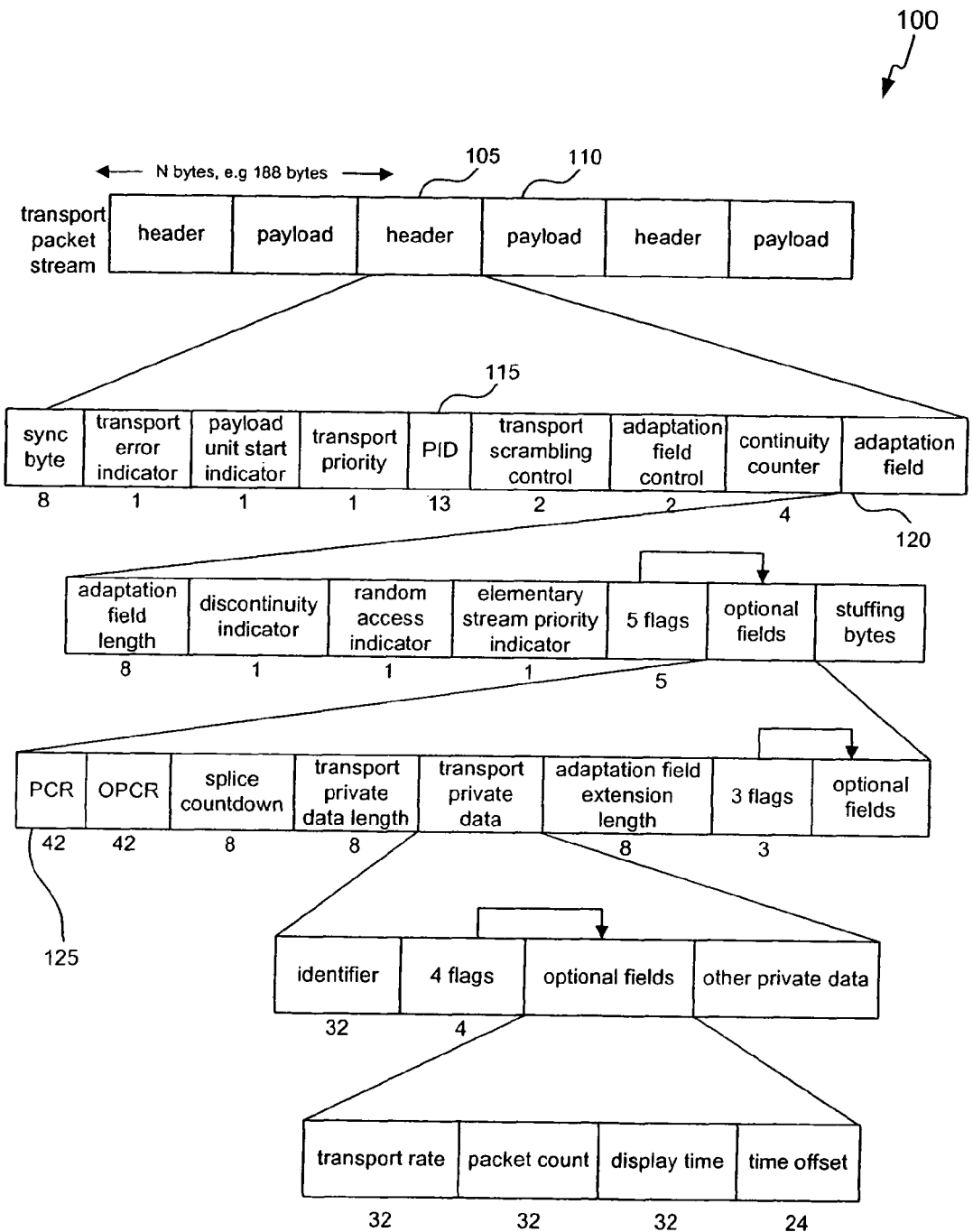
FIG. 1A is a diagram of the structure of a MPEG-2 packet.

MPEG-2 provides for the packetized transport of digitized video, audio, and data sources. Such packets are of a fixed 188-byte size, and include a header 105 and a payload 110. FIG. 1A indicates the structure of an MPEG-2 packet 100. The header 105 includes a 13-bit program ID (PID) field 115, which serves to identify the information in the packet as belonging to a particular stream of information. The MPEG-2 packet also includes an adaptation field 120, which includes of a series of flags, together with optional fields whose presence is indicated by the value of the preceding flags. Private user data can be defined and carried within the adaptation field 120. In conventional MPEG 115, PCR values 125 are embedded within a MPEG-2 transport stream and provide the traditional method for recovery of an encoder clock in the decoder system.

Figure 1B:
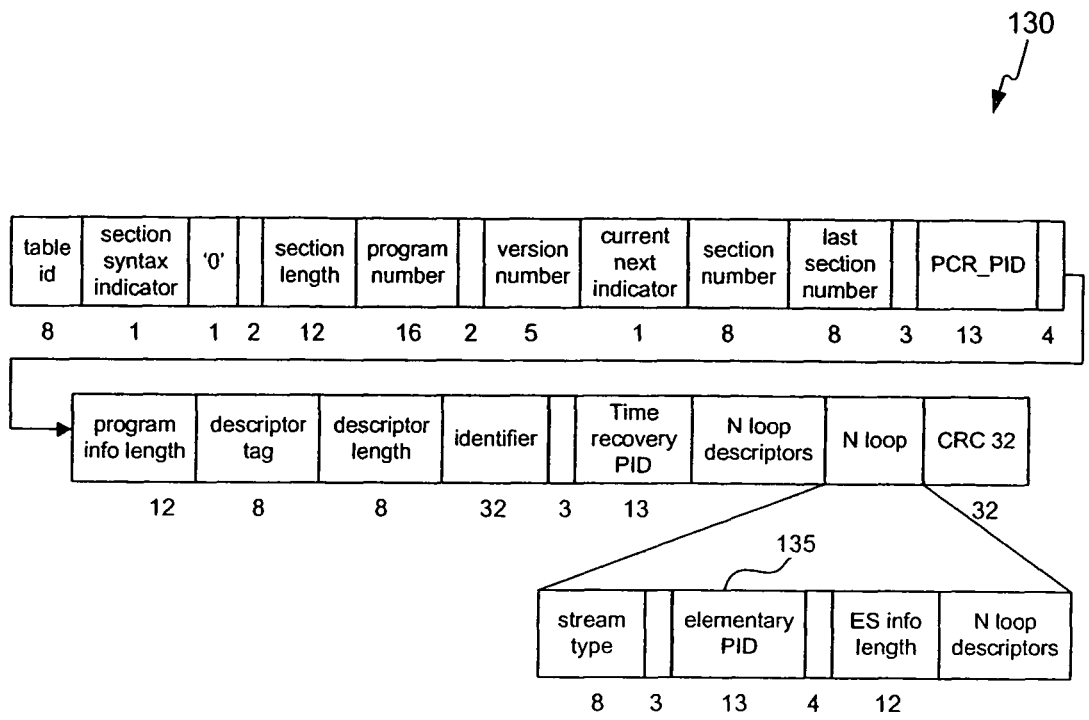
FIG. 1B is a diagram of the structure of a Program Map Table (PMT).

FIG. 1B is a diagram of the structure of a Program Map Table (PMT) 130. A PMT 130 serves to identify the video, audio, and data content of a particular transport stream. In a typical example, a PMT 130 would identify the PID 135 for the audio component of a particular program, as well as the separate PIDs 135 for any video or data component of the particular program.

Figure 2:
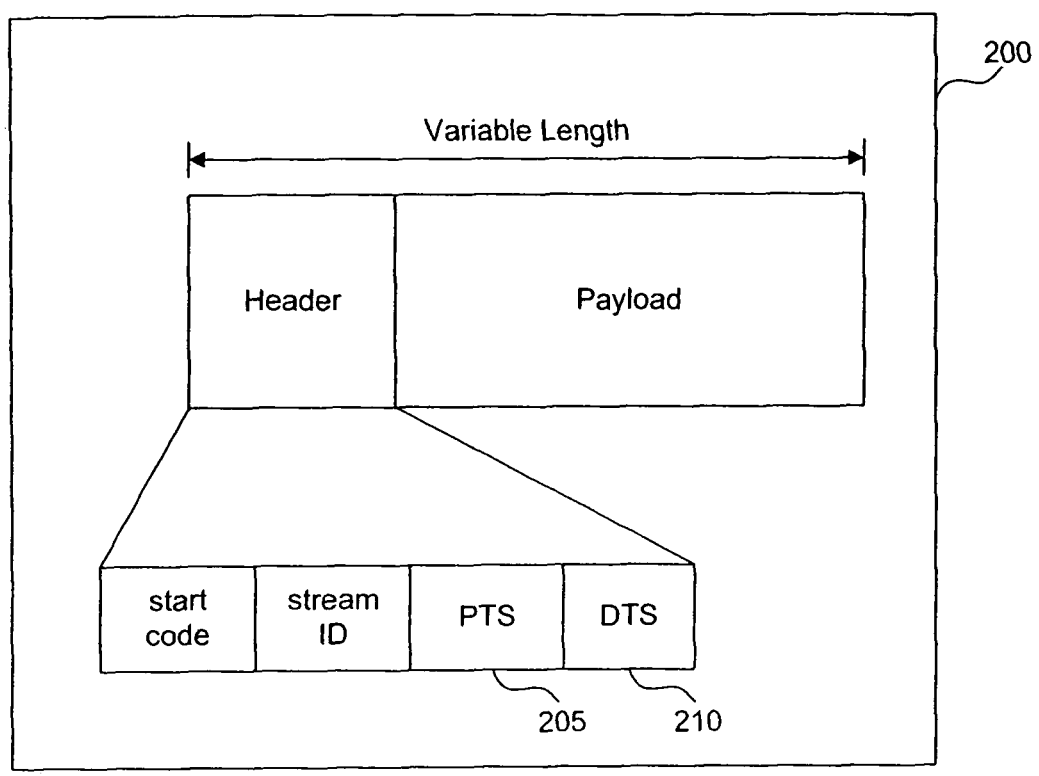
FIG. 2 is a diagram of the structure of a PES packet.

Prior to being packetized into the fixed-length MPEG-2 packets, video, audio, and data sources are initially packetized into Packetized Elementary Streams (PES). FIG. 2 indicates the structure of a PES packet 200. The following fields are optionally embedded within a PES packet: (a) decoding time stamp (DTS) 205, which indicates the time at which a packet is to be decoded by the decoder; and (b) presentation time stamp (PTS) 210 that signals the decoder system as to the timing of presentation of the individual units of video and audio information. In order to ensure synchronization, the PTS values 205 and the DTS values 210 are derived from the same clock that provides the PCR values.

Figure 3:
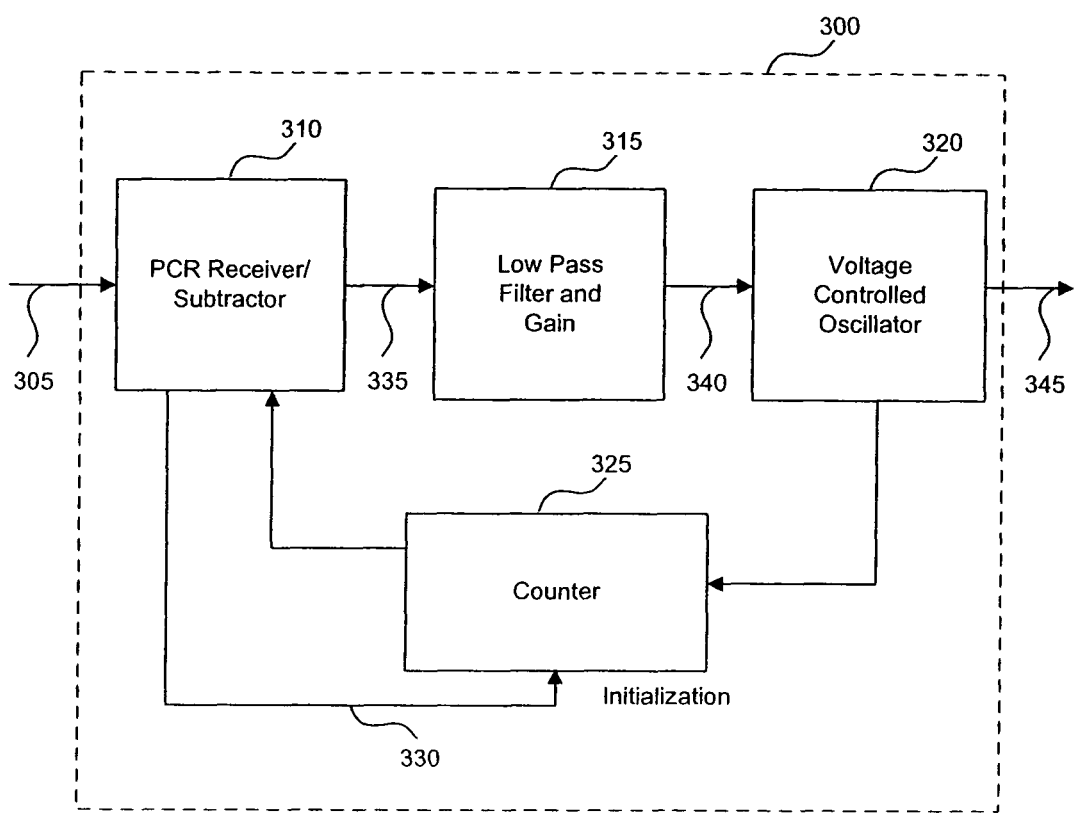
FIG. 3 is a block diagram of a conventional circuit for system clock recovery using PCR values.

FIG. 3 illustrates the conventional approach to encoder clock recovery. Such a circuit 300 comprises a PCR receiver/subtractor 310, a low-pass filter and gain unit 315, a voltage controlled oscillator 320, and a counter 325. Upon receipt of a transport stream 305, the PCR receiver/subtractor 310 detects the PCR values embedded in the transport stream 305, compares the local time stamps from the counter 325 with those timestamps detected in the incoming transport stream 305. Based on this comparison, an error signal 335 is generated which is coupled to the low pass filter and gain unit 315. The output of the low pass filter and gain unit 315 is a correction signal 340 and is coupled to the voltage controlled oscillator 320. The output of the voltage controlled oscillator 320 is coupled to the counter 325 as part of the feedback loop. If the PCR value detected by the PCR receiver/subtractor 310 is an initial value, the PCR receiver/subtractor 310 generates an initialization signal 330, which initializes the counter 325. As noted above, in order for the conventional circuit 300 to function correctly, PCR values must be embedded into the transport stream 305.

Using the conventional approach of FIG. 3, the transport rate is derived at the decoder side by using the PCR values, as follows:

$$\text{transport\_rate}(i) = \frac{((i' - i'') * \text{system\_clock\_frequency})}{PCR(i') - PCR(i'')}$$

i is the index of any byte in the transport stream for i"<i<i'.
i' is the index of the byte containing the last bit of the immediately following program_clock_reference_base field applicable to the program being decoded.
i" is the index of the byte containing the last bit of the most recent program_clock_reference_base field applicable to the program being decoded.
PCR(i") is the time encoded in the program clock reference base and extension fields in units of the system clock.
Note: i"<i≤i'

If the transport rate is assumed to be constant, any deviation in the sequence of PCR values can be interpreted as PCR jitter. To lock onto the incoming transport stream 305, the conventional decoder has to evaluate each PCR value and adjust its local phase-locked loop (PLL) to absorb the resulting jitter.

As an alternative to embedding PCR values into the transport stream 305 and the associated requirement of evaluating each PCR value, the current invention occasionally transfers the transport rate explicitly such that the decoder can use this explicit transport rate as a locking reference with which to adjust its clock. The transport rate value is embedded as user private data in the adaptation field 120 of the MPEG-2 packet. For each occasional MPEG-2 packet m carrying such user private data, the transport rate R(m) at the encoder is calculated as follows:

$$R(m) = \frac{b * SC}{\Delta t(m, n)}$$

$$b = |n-m| * \text{packet\_length} * 8$$

R(m): transport rate carried in packet m
b: total number of bits transferred between packet number m and packet number n
m: packet number carrying R(m)
n: packet number carrying R(n)
packet_length: length in bytes of each transport packet
SC: system clock measured in Hz.

$$27{,}000{,}000 - 801 \leq SC \leq 27{,}000{,}000 + 810$$

Δt(m,n): encoder sampling time difference between packet m and packet n, in units of one tick of a 27 MHz clock.

In order to calculate the transport rate R(m) at the encoder (during transmission), packet n must be selected, for which there are at least two approaches for making this selection. The first approach is to use the preceding packet that contains embedded transport rate information. In this case, the transport rate is computed by dividing the number of bits transmitted since the last packet containing transport rate information by the amount of time taken to send those bits. The second approach is to use the next packet containing transport rate information, in which case the transport rate is computed by dividing the number of bits transmitted until the next packet containing the transport rate information divided by the amount of time taken to send those bits. Either approach may be used provided both the encoders and decoders use the same approach.

At the decoder side, the local system time counter is used to estimate the transport rate R'(m). The difference between the actual encoder transport rate, R(m), and the transport rate R'(m) estimated by the decoder, together with the total number of intervening bits b, creates an error signal by which the decoder can lock or synchronize its time clock to that of the encoder. As noted below, one possible decoder design objective in a particular embodiment of the invention would be to keep the decoder clock synchronized with the encoder system time clock to better than one-half a microsecond. Different embodiments of the design for different applications may choose different synchronization design objectives.

$$R'(m) = \frac{b * SC}{\Delta t'(m, n)}$$

R'(m): Calculated transport rate based on local time
Δt'(m,n): Sampling time difference based on decoder's local counter $$\left| \frac{b}{R(m)} - \frac{b}{R'(m)} \right| \leq 5 \times 10^{-7} \text{ seconds}$$

Note: $5 \times 10^{-7}$ seconds can be replaced by a larger number as required by each particular design embodiment of the invention.

As the equation above indicates, the accuracy of the estimated transport rate R'(m) depends on the packet numbers n and m. If during the transmission, packets are either dropped or added, as would be the case during re-multiplexing, the sampling time distance will change with the result that the encoder and the decoder can no longer synchronize. To address this issue, packet numbers n and m are explicitly embedded in the transport stream, as well as the transport rate information. For example, the encoder explicitly sends packet number m in the same packet that carries the transport rate R(m).

The table below illustrates the relationship between the PCR_jitter of the conventional PCR_based approach of system clock recovery and the embedded transport rate information R(m) approach of this invention. Consider a transport stream with theoretical transport rate of 12.5 Mbps. The PCR values are carried as follows:

| Packet | PCR_value | PCR_jitter (ns) | R'(m) (bps) |
|---|---|---|---|
| 113 | 14695 | | |
| 430 | 1044514 | −4.421 | 12499998.54 |
| 747 | 2074333 | −4.421 | 12499998.54 |
| 1064 | 3104152 | −4.421 | 12499998.54 |
| 1381 | 4133971 | −4.421 | 12499998.54 |
| 1698 | 5163790 | −4.421 | 12499998.54 |
| 2015 | 6193608 | 32.616 | 12500010.68 |
| 2332 | 7223427 | −4.421 | 12499998.54 |

The first column contains the packet numbers of packets where pcr_flag is set to 1. The second column shows the PCR_value carried within the corresponding packet. The third column is PCR_jitter calculated based on the conventional MPEG-2 algorithm. The fourth column is the calculated transport rate R'(m) based on packet number and Δt, where Δt equals the difference in PCR_values. Based on this example, the PCR_jitter in nanosecond units can be interpreted as transport rate jitter. Thus if R(m) is embedded explicitly in the transport stream, the decoder can use such a value to recover the system time clock and adjust its PLL to lock onto the transport stream. Hardware decoders usually work with millisecond precision and therefore the bit per second precision of R'(m) will be satisfactory.

Figure 4:
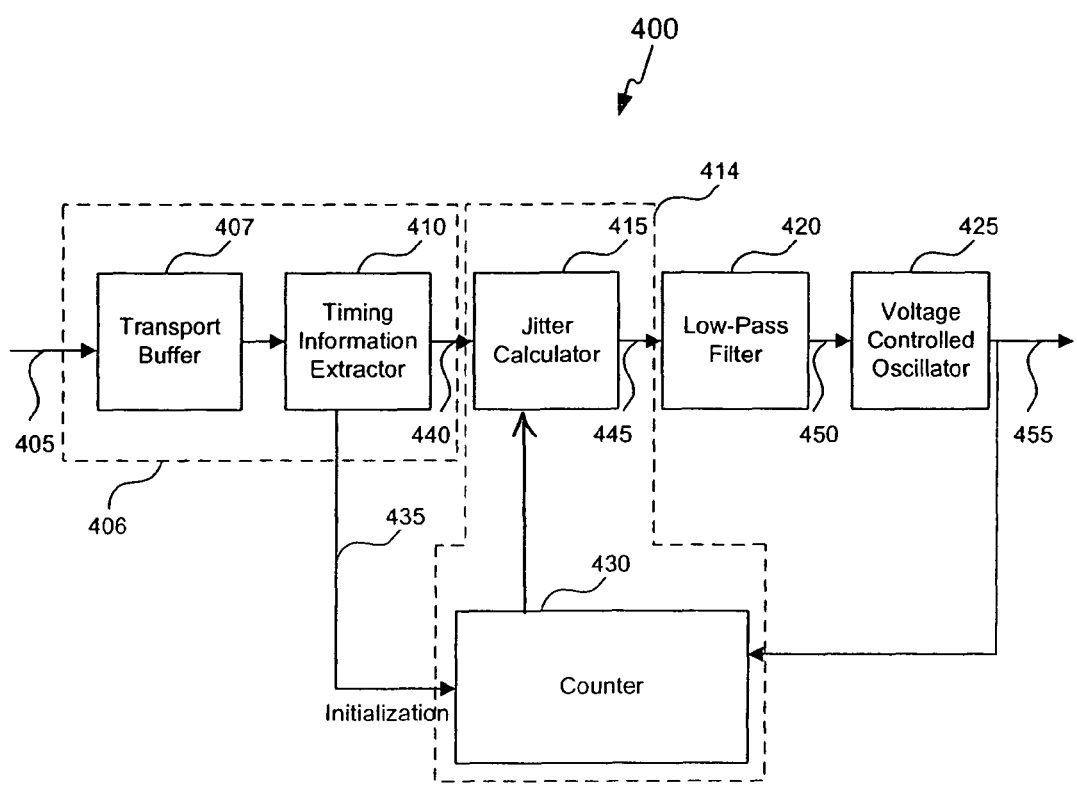
FIG. 4 is a block diagram of a system clock recovery circuit without using PCR values, according to an embodiment of the invention.

FIG. 4 illustrates the block diagram of a decoder clock recovery circuit 400, according to an embodiment of the invention. This circuit includes: a packet receiver 406 having a transport buffer 407 and a timing information extractor 410; a jitter calculator 415, a low-pass filter 420, a voltage controlled oscillator 425, and a counter 430. Incoming packet streams 405 are received by the transport buffer 407, which is coupled to the timing information extractor 410. The timing information extractor 410 is coupled to the jitter calculator 415 and the initialization port of the counter 430. The output of the jitter calculator 415 is coupled to the low-pass filter 420. The output of the low-pass filter 420 is coupled to the voltage controlled oscillator 425. The output of the voltage controlled oscillator 425 provides the decoder system clock output 455. The output of the voltage controlled oscillator 425 is also coupled to the counter 430. The counter 430 is coupled to the jitter calculator 415. As noted earlier, this new approach requires changes to firmware only and therefore existing PCR-based hardware can be used.

The packet receiver 406 receives MPEG packets 405 and extracts timestamp information 440 based on embedded transport rate information and packet count information. Specifically, the transport buffer 407 captures the packets in the transport stream and distributes the relevant bytes to the timing information extractor 410. The timing information extractor 410 detects the embedded transport rate information as well as the packet count information, and determines the encoder timestamp information 440 associated with the packets received. As discussed above, the packet transfer rate value can be embedded as user private data in the adaptation field 120 of the MPEG-2 packet. The packet count can also be embedded as user private data of the adaptation field 120 of the MPEG-2 packet.

The encoder timestamp information 440 is forwarded to the jitter calculator 415 which generates an error signal 445 based on the difference between the encoder timestamp 440 and the local timestamp obtained from the counter 430. For the counter 430 to have an accurate reading, the timing information extractor 410 initiates the counter 430 upon receipt of an initialization data string within the received data stream 405. The error signal 445 generated by the jitter calculator 415 is passed through a low pass filter to create a correction signal 450. The correction signal 450 is input to the voltage controlled oscillator 425 such that the frequency of the voltage controlled oscillator 425 is adjusted until it is synchronized to the encoder clock frequency. A sample of this output of the voltage controlled oscillator 425 is fed into the counter 430. The counter 430 and jitter calculator 415 can be referred to as a feedback loop 414 because timestamps based on the VCO output 455 are compared to the encoder timestamp information 440 that is extracted from the received packets so as to create the error signal 445. The error signal 445 is used to adjust the frequency of the VCO 425.

As noted above, the display_time, time_offset, transport_rate and packet_count are extracted by the timing information extractor 410. During the initialization stage, display_time and time_offset are sent to the local counter 430. Transport_rate and packet_count are sent to the jitter calculator and are buffered together with the current system clock value. The jitter or error signal 445 is calculated based on the following items: previous_packet_count, previous_system_clock_value, current_packet_count, current_system_clock_value, and current_transport_rate. The resulting jitter or error signal 445 is low-pass filtered and used as control to the VCO to recover the system clock. An example formula to calculate the error signal 445, shown as e below, is provided as follows:

$$e = ((\text{current\_packet\_count} - \text{previous\_packet\_count}) \% (2^{32})) *$$
$$188 * 8 / \text{current\_transport\_rate} +$$
$$\text{previous\_system\_clock\_value} - \text{current\_system\_clock\_value}.$$

All data that are necessary to recover the system time clock in this invention are carried in the adaptation field as user private data. In circumstances where one MPEG-2 program contains both audio and video information, an embodiment of the current invention offers an efficiency in terms of clock recovery effort. Rather than having each individual audio and video information stream of a particular program carry its own clock recovery data, this redundancy can be avoided by placing a Time Recovery Descriptor into the first descriptor loop of the particular program's map table (PMT). The syntax and semantic definition of such a Time Recovery Descriptor is shown below:

| Syntax | Semantic Definition |
| --- | --- |
| Descriptor_tag | 8-bit field set to 0xFF. |
| Descriptor_length | 8-bit field specifying the number of descriptor bytes immediately following the descriptor_length. |
| Identifier | 32-bit field that identifies the Time Recovery Descriptor. This value should be 0x4252434D. |
| Reserved | 3-bit reserved field that should be '111'. |
| Time_Recovery_PID | 13-bit field specifying which PID is used to recover the system time clock. |

As noted above, all data necessary to recover the system time clock in this invention is carried in adaptation field's user private data. The syntax and semantic definition of the Program Time Recovery Private Field is shown below. It should be noted that when the random_access_indicator is set to 1, the user_private_data_flag must also be set to 1.

| Syntax | Semantic Definition |
| --- | --- |
| if (transport private_data_flag=='1') { | |
| transport_private_data_length | 8-bit field specifying the number of private data bytes immediately following the transport_private_data_length. |
| Identifier | 32-bit field that identifies the time recovery private field. The value should be set to 0x4252434D. |
| Reserved | 4-bit reserved field that should be '1111'. |
| transport_rate_flag | 1-bit flag. When it equals '1', transport_rate is carried in the following syntax. |
| Packet_count_flag | 1-bit flag. When it equals to '1', packet_count is carried in the following syntax. |
| Display_time_flag | 1-bit flag. When it equals to '1', display_time is carried in the following syntax. |
| time_offset_flag | 1-bit flag. When it equals to '1', time_offset is carried in the following syntax. |
| if (transport_rate_flag) | |
| transport_rate | 32-bit field carrying the transport rate as determined by the encoder. The unit of transport_rate is bits per second. |
| if (packet_count_flag) | |
| Packet_count | 32-bit field carrying the total output transport stream packet number modulo 2^32. |
| if (display_time_flag) | |
| display_time | 32-bit field carrying the display_time of the first access unit after the current adaptation_field. The unit of display_time is one tick per 90 kHz clock. |
| If (time_offset flag) | |
| time_offset | 24-bit field carrying STC initialization offset relative to display_time carried in the same Time Recovery Private Field. |
| } | |

Note that the system time clock (STC) at the decoder should be set to initSTC at the time when the access unit corresponding to display_time is removed from compressed data buffer, where: initSTC=display_time−time_offset.

Normally, the time delay between each random access unit is dependent upon the infrastructure, and can be as large as one to five seconds. However, to successfully guarantee the system clock update process, transport_rate and packet_count information have to be sent at least every 100 milliseconds. Accordingly, even in the absence of a random access unit, a time_recovery_private field must be carried to guarantee the integrity of the system clock update process. Therefore, a time_recovery_private field may be present even when the random_access_indicator flag is set to zero.

In certain infrastructures, PES packets are not required. Under these circumstances, PTS and DTS values are not created. However, the relationship between the display time of the initial access unit (either audio, video or data) is always fixed with respect to all succeeding access units once the information coding structure is known at the elementary stream level. Thus, the only values needed in order to properly display and synchronize the digitized information sources are the initial display_time and one initial value for the system time clock (STC). Once these initial values are known, the display time for all subsequent access units can be derived. Therefore, in an embodiment of the current invention, in the scenario where PES packets are not used, the display_time and time_offset of the initial STC will be transferred.

If the infrastructure does not use packetized elementary stream (PES) packet wrapping, all PIDs shall carry the time_recovery_private field containing display_time in order to synchronize to each other. However, only one PED is required to carry the transport_rate, packet_count and time_offset to initialize the system time clock (STC).

Figure 5:
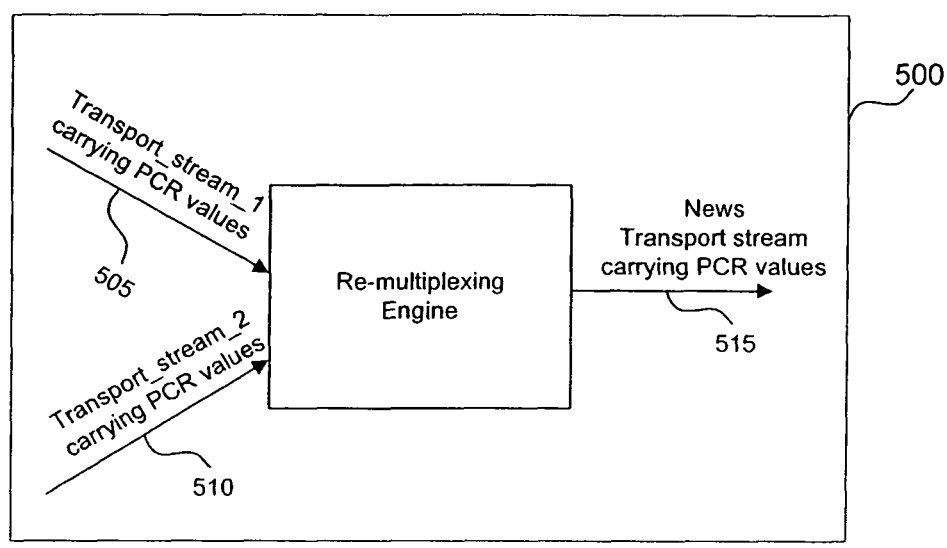
FIG. 5 is a block diagram of a conventional system for re-multiplexing using PCR values.

Through multiplexing, MPEG-2 permits multiple types of multimedia information to be combined into one single byte stream. A common circumstance is where a service provider will accept multiple transport streams from various sources and thereby create its own transport stream by selecting different programs from different sources. This combination requires the use of a re-multiplexer. FIG. 5 shows a conventional transport stream re-multiplexing engine 500. Two transport stream inputs, input_stream_1 505 and input_stream_2 510, each carrying embedded PCR values, are sent to the re-multiplexing engine. The re-multiplexing engine in turn generates a single combined output_stream 515. Within the re-multiplexing engine, the output packet is selected either from input_stream_1 505 or from input_stream_2 510. The packet routing and dropping selection is based on the output transport rate and the scheduling algorithm of the re-multiplexing engine. If the scheduling algorithm guarantees performance, there is no need to adjust PCR values in the output transport stream. Therefore, the PCR values can remain the same as they were in input_stream_1 505 and input_stream_2 510.

In the present invention, PCR values are not carried within the input transport streams. On the other hand, transport rate information and packet count information are carried occasionally. Thus at the re-multiplexing stage, the values of transport rate and packet count need to be re-evaluated and updated in the output stream.

Figure 6:
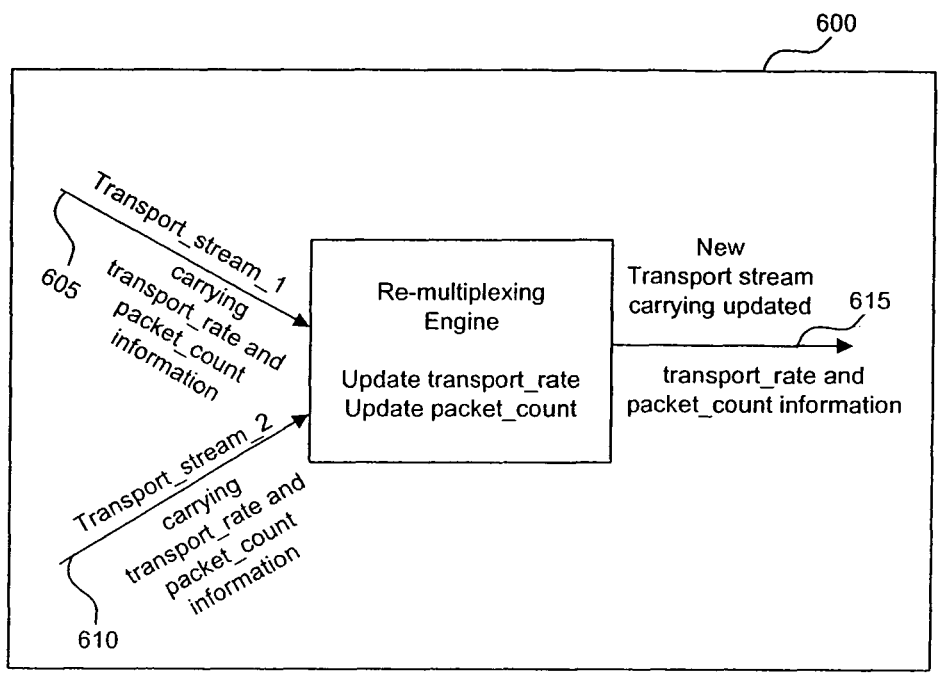
FIG. 6 is a block diagram of a re-multiplexing system without using PCR values, according to an embodiment of the invention.

FIG. 6 shows a re-multiplexing engine, according to an embodiment of the invention. Two transport stream inputs, input_stream_1 605 and input_stream_2 610, each occasionally carrying embedded transport rate information and embedded packet count information, are sent to the re-multiplexing engine. The re-multiplexing engine in turn generates a single combined output_stream 615. Within the re-multiplexing engine, the output packet is selected either from input_stream_1 605 or from input_stream_2 610. During the re-multiplexing, the transport rate information and the packet count information are re-evaluated, updated and re-inserted into the output transport stream 615.

Error handling in an embodiment of this invention is handled as follows. For the situation of a marked time_base discontinuity, the following approach is taken: If the discontinuity indicator is set, LSCS1=display_time−time_offset is calculated and loaded into STC base immediately. For the situation of an unmarked time_base discontinuity, the following approach is taken: |LSTC−(display_time−time_offset)|>THR, where THR is a settable threshold. In this case, LSCS1=display_time−time_offset is calculated and loaded into STC base immediately.

Figure 7:
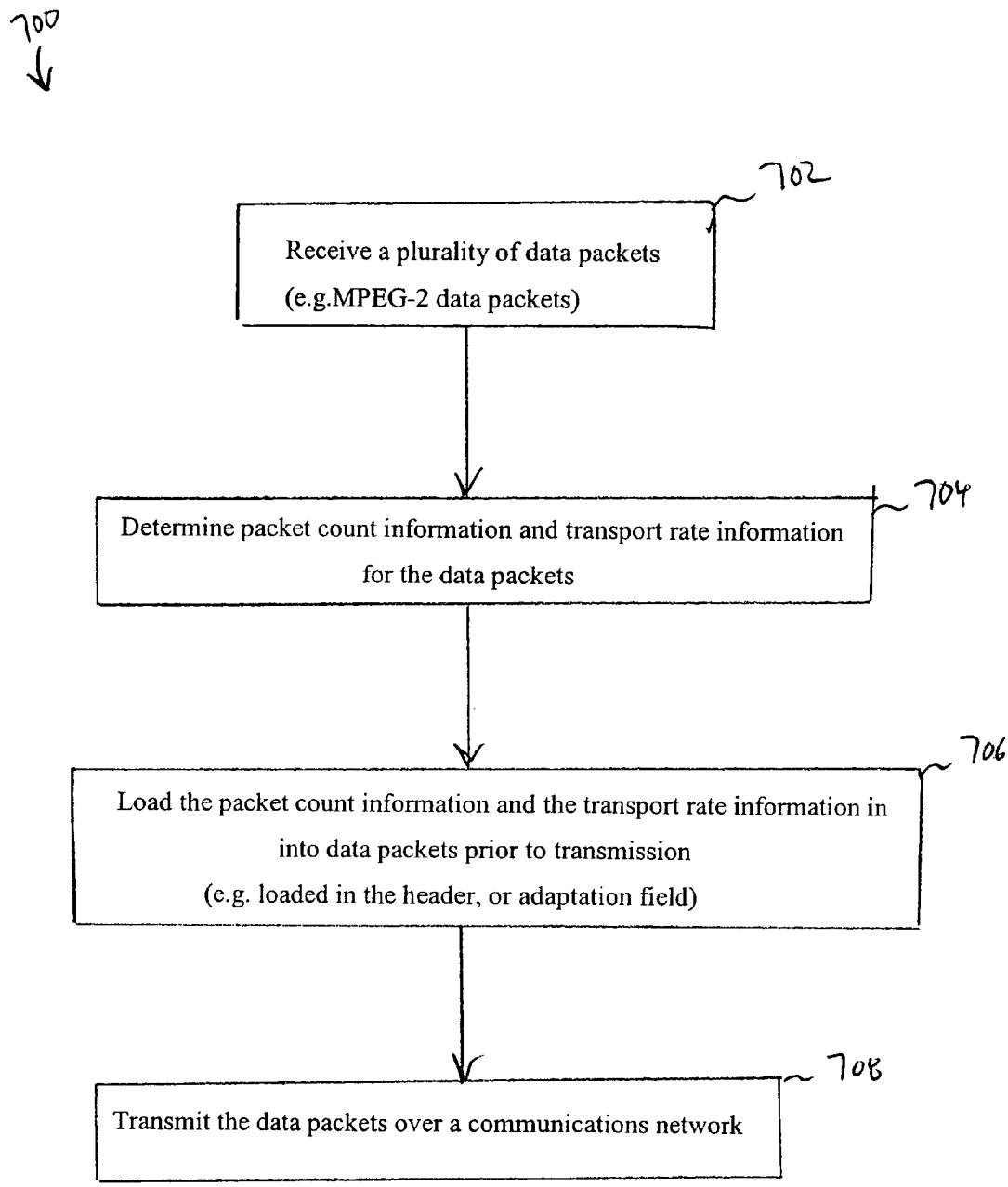
FIG. 7 is a flowchart diagram that illustrates a method of generating data packets having packet count and rate information without directly sending PCR timestamps, according to embodiment of the present invention.

FIG. 7 illustrates a flowchart 700 that further describes encoding digital communication packets for transmission over a communications system. The digital communications packets are encoded with packet count information and packet transport rate information. Based on the invention described herein, it is no longer required to send PCR information in the data stream. The stream may contain no PCR information, although it is still allowed. Instead, the transport rate is used to represent the jitter. Transport rate represents a period and PCR is an instantaneous value. Using transport rate and packet count (which is sent is case of packet loss), a timing duration is derived between two packets containing the timing information. To calculate the timestamp, the previous system clock value is added to this timing duration. For example, the equation: e=((current_packet_count−previous_packet_count)%($2^{32}$))*188*8/current_transport_rate+previous_system_clock value−current_system_clock value, provides the details for this calculation.

In step 702, a plurality of data packets are received, such as MPEG-2 data packets.

In step 704, packet count information and transport rate information for the data packets is determined.

In step 706, the packet count information and the transport rate information is loaded into data packets prior to transmission. For instance, the packet count information and data transport information could be loaded into the header of the data packets during data packet encoding at the transmitter. More specifically, for MPEG-2, the packet count information and data transport information can be loaded into the adaptation field 120 of the MPEG-2 header 105 that is illustrated in FIG. 1A.

In step 708, the data packets are transmitted over a communications network for receipt and processing.

Figure 8:
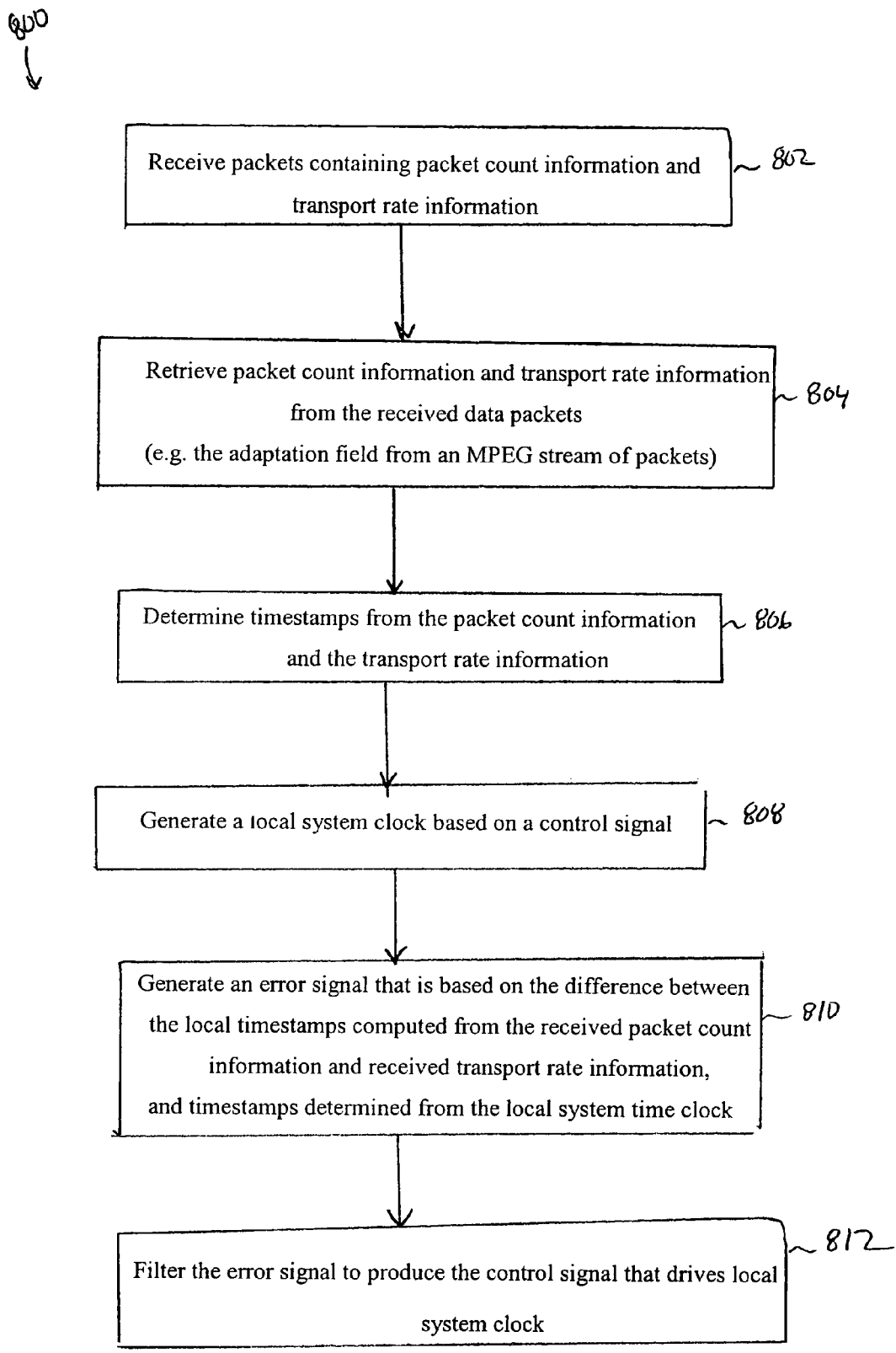
FIG. 8 is a flowchart diagram that illustrates a method for recovering a system clock, according to an embodiment of the invention.

FIG. 8 illustrates a flowchart 800 for reconstructing a system clock based on data packets carrying packet count and transport rate information. The invention described herein is not limited by the order of the steps in the flowchart 800. In other words, some of the steps can be performed simultaneously, or in a different order, without deviating from the scope and spirit of the invention.

In step 802, packets containing packet count information and transport rate information from an encoding clock are received.

In step 804, the packet count information and transport rate information is retrieved from the received data packets. For example, the timing information extractor 410 can extract the packet count information and the transport rate information from MPEG packets. In one embodiment, the adaptation field 120 in an MPEG stream of packets carries the packet count information and the transport data rate information.

At step 806, timestamps are determined from the packet count information, the transport rate information, and previous local system clock value.

At a step 808, a local system clock is generated based on a control signal. For example, the VCO 425 generates a local system clock based on a control signal 450. Step 808 also includes the steps of generating local time stamps from the local system clock.

At a step 810, an error signal is generated that is based on the difference between the timestamps computed from the received packet count information and received transport rate information, and timestamps determined from the local system time clock. For example, the jitter calculator 415 generates an error control signal.

At a step 812, the error signal is filtered to produce the control signal. For example, the low pass filter 420 generates a filtered output of the error signal 445, so as to generate the control signal 450.

Figure 9:
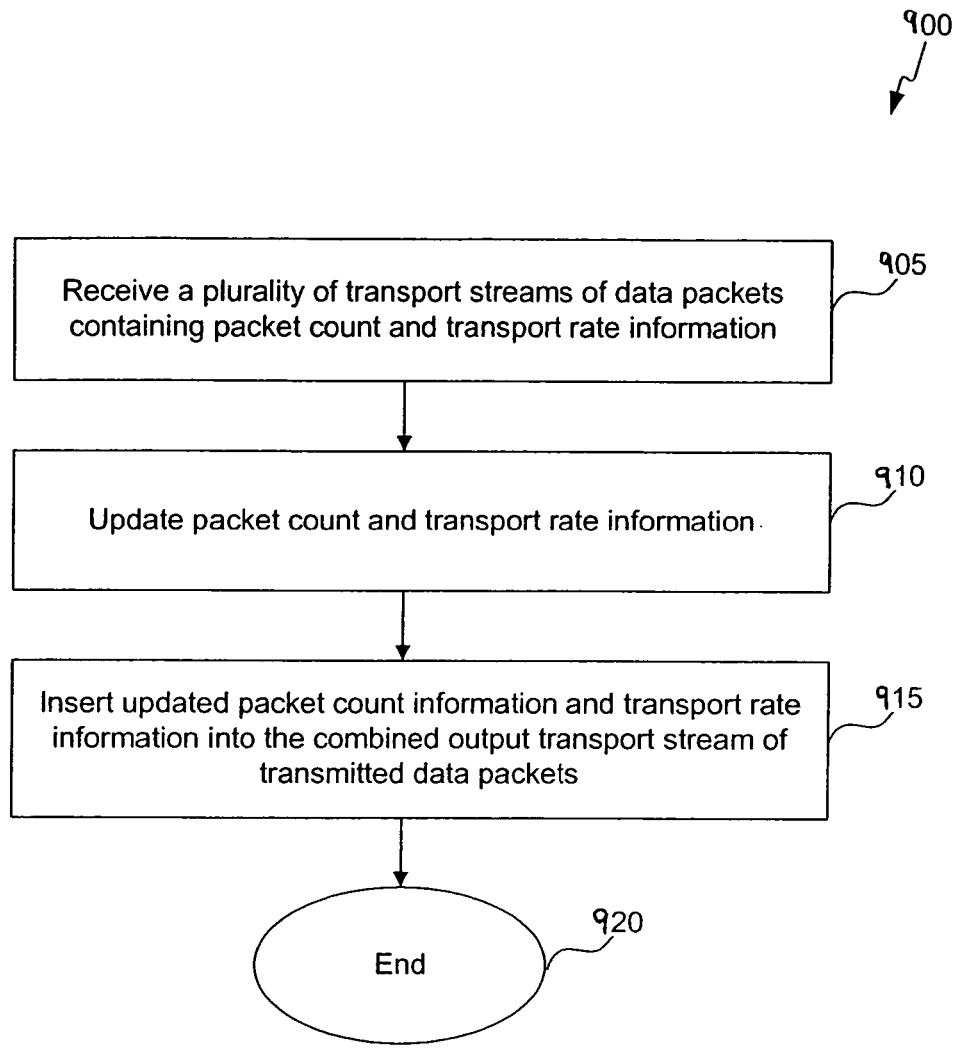
FIG. 9 is a flowchart diagram that illustrates a method for re-multiplexing a plurality of transport streams, according to an embodiment of the invention.

FIG. 9 illustrates 900 that describes the operational steps for a re-multiplexing system, such as re-multiplexing system 500. At a step 905, a plurality of transport streams of information packets containing packet count information and transport rate information are received. At a step 910, the packet count information and the transport rate information are updated. At a step 915, the updated packet count information and transport rate information is inserted into the combined output transport stream of transmitted information packets.

Finally, it should be noted that the invention described herein is not limited to MPEG-2 clock recovery applications. For example, the nominal frequency of the system time clock can be any frequency; the MPEG-2 frequency of 27 MHz is merely an example. Similarly, the use of embedded transport rate information and packet count information for clock recovery purposes is not limited to MPEG-2 packet structures, but is equally applicable to any transport streams for which clock recovery is required at the destination. More specifically, the invention is applicable to other packet based communications system, other than MPEG.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed is:

1. In a communications system, a clock recovery apparatus to recover an encoder clock for received packets, comprising:
   a packet receiver configured to detect packet count information and a transport rate value embedded in the received packets and that is representative of the encoder clock for the received packets;
   a voltage controlled oscillator for generating a local system time clock, the voltage controlled oscillator having an input that allows a frequency of the local system time clock to be adjusted in proportion to a control signal received on the input;
   a feedback loop adapted to output an error signal that represents a difference between the frequency of the local system time clock and a frequency of the encoder clock; and
   a low-pass filter circuit adapted to filter the error signal for input to the voltage controlled oscillator,
   wherein the packet receiver includes a packet timing extractor for outputting timestamp data that is representative of the encoder clock based on the packet count information and the transport rate value, and
   wherein the feedback loop further comprises a counter to output local timestamp data whose value increments with cycles of the local system time clock, the counter having an input that initializes its output value, and a jitter calculator to output the error signal equal to a difference between the local timestamp data from the counter and the timestamp data from the packet receiver.

2. The clock recovery apparatus of claim 1, wherein the received packets are MPEG-2 type packets.

3. The clock recovery apparatus of claim 1, wherein the frequency of the local system time clock is in the range of 26.999199 MHz to 27.000810 MHz.

4. The clock recovery apparatus of claim 1, wherein the counter is a digital counter.

5. The clock recovery apparatus of claim 1, wherein the packet receiver retrieves the packet count information and the transport rate value from a header portion of one or more of the received packets.

6. The clock recovery apparatus of claim 5, wherein the received packets are MPEG-2 packets, and the packet count information and the transport rate value are located in an adaptation field of one or more MPEG-2 headers.

7. The clock recovery apparatus of claim 6, wherein the packet count information and the transport rate value are embedded as private user data in the adaptation field.

8. The clock recovery apparatus of claim 1, wherein the packet count information and the transport rate value are embedded in a same packet of the received packets.

9. The clock recovery apparatus of claim 1, wherein the packet count information and the transport rate value are embedded as private user data in an adaptation field of a header portion of a packet of the received packets.

10. The clock recovery apparatus of claim 1, wherein Program Clock Reference (PCR) data that is representative of the encoder clock is not embedded in the received packets.

11. In a communications system, a clock recovery apparatus to recover an encoder clock for received packets, comprising:
   a packet receiver configured to detect packet count information and a transport rate value embedded in the received packets and that is representative of the encoder clock for the received packets;
   a voltage controlled oscillator for generating a local system time clock, the voltage controlled oscillator having an input that allows a frequency of the local system time clock to be adjusted in proportion to a control signal received on the input;
   a feedback loop adapted to output an error signal that represents a difference between the frequency of the local system time clock and a frequency of the encoder clock; and
   a low-pass filter circuit adapted to filter the error signal for input to the voltage controlled oscillator,
   wherein the feedback loop further comprises:
      a counter to output local timestamp data whose value increments with cycles of the local system time clock, the counter having an input that initializes its output value, and
      a jitter calculator to output the error signal equal to a difference between the local timestamp data from the counter and timestamp data representative of the encoder clock, wherein the timestamp data is determined based on the packet count information and the transport rate value.

12. The clock recovery apparatus of claim 11, wherein Program Clock Reference (PCR) data that is representative of the encoder clock is not embedded in the received packets.

13. The clock recovery apparatus of claim 11, wherein the received packets are MPEG-2 type packets.

14. The clock recovery apparatus of claim 11, wherein the frequency of the local system time clock is in the range of 26.999199 MHz to 27.000810 MHz.

15. The clock recovery apparatus of claim 11, wherein the counter is a digital counter.

16. The clock recovery apparatus of claim 11, wherein the packet receiver retrieves the packet count information and the transport rate value from a header portion of one or more of the received packets.

17. The clock recovery apparatus of claim 16, wherein the received packets are MPEG-2 packets, and the packet count information and the transport rate value are located in an adaptation field of one or more MPEG-2 headers.

18. The clock recovery apparatus of claim 17, wherein the packet count information and the transport rate value are embedded as private user data in the adaptation field.

19. The clock recovery apparatus of claim 11, wherein the packet count information and the transport rate value are embedded in a same packet of the received packets.

20. The clock recovery apparatus of claim 11, wherein the packet count information and the transport rate value are embedded as private user data in an adaptation field of a header portion of a packet of the received packets.

* * * * *